United States Patent [19] Nickerson et al.

[11] 4,076,850
[45] Feb. 28, 1978

[54] COMPOSITION AND METHOD FOR SAFELY EXTENDING STORAGE LIFE OF FOODS

[75] Inventors: John T. R. Nickerson, Onset; John R. Darack, Framingham, both of Mass.

[73] Assignee: Dirigo Corporation, Boston, Mass.

[21] Appl. No.: 646,018

[22] Filed: Jan. 2, 1976

[51] Int. Cl.[2] .......... A23B 4/00

[52] U.S. Cl. .......... 426/332; 424/308; 424/317; 426/321; 426/335; 426/532

[58] Field of Search .......... 426/321, 322, 330.1, 426/332, 335, 531, 532, 614, 615; 424/308, 317

[56] References Cited

U.S. PATENT DOCUMENTS

| | | | |
|---|---|---|---|
| 2,715,068 | 8/1955 | Levin | 426/532 X |
| 3,219,464 | 11/1965 | Cole | 426/321 |
| 3,276,881 | 10/1966 | Troller | 426/532 |
| 3,792,177 | 2/1974 | Nakatani et al. | 426/532 |
| 3,899,594 | 8/1975 | Nickerson et al. | 426/321 X |

OTHER PUBLICATIONS

Thomas Furia, Handbook of Food Additives; pp. 144–150; The Chemical Rubber Company; 1968.

Norman Desrosier, The Technology of Food Preservation; pp. 187–193, The Ari Publishing Company; 1959.

*Primary Examiner*—Raymond N. Jones
*Assistant Examiner*—Robert J. Warden
*Attorney, Agent, or Firm*—Joseph Zallen

[57] ABSTRACT

A buffered aqueous solution of a small amount of bacterial inhibitor, such as methyl parabenzoic acid or a mixture of sorbic acid and sodium propionate extends the storage life under refrigeration of such products as shelled, hard-cooked eggs, cooked peeled shrimp, cooked and uncooked scallops, and cooked mushrooms.

18 Claims, No Drawings

COMPOSITION AND METHOD FOR SAFELY EXTENDING STORAGE LIFE OF FOODS

BACKGROUND OF INVENTION

This invention relates to a composition and a method for increasing the storage life of food products which normally spoil or lose flavor. In particular this invention is related to preventing bacterial growth or spoilage in food products which normally spoil or lose flavor in a short time under refrigeration and which are usually substantially structurally unaffected by immersion in cool water. Such products include, for example, shelled hard-cooked eggs, cooked peeled shrimp, cooked and uncooked scallops, and cooked mushrooms.

At the present time there is no method available for storing such products under refrigeration for any extended period of time. Shelled hard-cooked eggs may be pickled in vinegar and salt but the flavor characteristics are altered so that the "boiled egg" flavor is lost. Once a package of frozen shrimp is defrosted, the product must be immediately used or else quickly spoils or acquires an off-flavor. Mushrooms are pickled but this alters flavor. Scallops may be frozen or refrigerated for short periods but are normally not canned. None of these above products will be useful for more than several days and often less even when stored under refrigeration.

Special attempts have been made in the past to extend the storage life of shelled hard-cooked eggs. One such method is described in the patent to Trelease, U.S. Pat. No. 2,593,223. Trelease recommends soaking hard boiled eggs in an edible acid solution such as citric or acetic acid and then withdrawing the eggs from the solution, placing them in lacquered cans with boiling water and then sealing and heat processing until sterile. We have found, however, that this heat processing results in a burnt smell and sulfide odor with considerable change in flavor.

One object of the present invention is to provide a method and composition for increasing the storage life under refrigeration of such food products while yet essentially retaining the original flavor.

A further object of this invention is to provide a method and composition which will reduce or inhibit the growth of pathogenic organisms in such food products.

Other objects and advantages of this invention will appear from the description and claims which follow.

SUMMARY OF INVENTION

The invention comprises generally storing such food products as shelled hard-cooked eggs, cooked peeled shrimp, cooked and uncooked scallops and cooked mushrooms in a special aqueous solution under refrigeration.

The solution comprises:

A. either
  (1) 0.08 to 0.20% of methyl parabenzoic acid, or
  (2) a mixture of 0.075 to 0.15% sorbic acid with approximately 0.22 to 0.45% sodium propionate; and B. either
  (1) citric acid partially neutralized with sodium or potassium hydroxide to provide a pH in the solution of approximately 4.5 to 5.5, or
  (2) a mixture of
    a) sodium or potassium dihydrogen phosphate,
    b) sodium or potassium monohydrogen phosphate and
    c) phosphoric acid,
  to provide a pH of approximately 4.5 to 5.5 in the solution.

When any of these products are stored in such a solution under refrigeration, there will be substantially no bacterial growth or change in flavor for a very long period of time. For example, shelled hard-cooked eggs had no bacterial growth, odor or change in flavor after 5 weeks of storage at refrigerated temperatures and egg salad made from such eggs by adding mayonnaise and seasonings had a fresh flavor and a very good typical taste.

In a similar manner fresh shrimp were boiled and peeled and stored in the compositions of this invention under refrigeration. Samples taken at the end of four months showed no evidence of spoilage. Bread crumbs were applied to fresh scallops which were deep-fat fried and stored in the compositions of this invention under refrigeration. The fried scallops remained unspoiled after five months of storage.

It should be noted that where these food products were immersed in 2% salt solution as controls, they quickly spoiled and became slimey with odors and off-colors. Thus, in the case of the fried scallops, a few weeks gave heavy gas formation and pronounced odor in the control samples.

Another feature of this invention is not only the ability of the compositions of this invention to prevent bacterial growth and spoilage generally but also their ability to inhibit and often reduce the content of any pathogenic organisms with which the products may have been contaminated. Such organisms commonly include food-born pathogenic organisms such as *Salmonella typhimurium* and *Staphylococcus aureus.* Thus, hard boiled peeled eggs innoculated with *Salmonella typhimurium* reduced the count, in one example, from 72,000 per ml. to 1,100 per ml. when stored in one of the compositions of this invention. This compares with a rise in the control from 72,000 to 100,000,000 per ml. Similarly, *Staphylococcus aureus* was reduced, in one example, from 530,000 per ml. to 3,500 per ml., while the control rose to 58,000,000 per ml.

In addition to citric acid, another useful buffering agent in the range of approximately 4.5 to 5.5 pH is a mixture of a) sodium or potassium dihydrogen phosphate,
b) sodium or potassium monohydrogen phosphate, and
c) phosphoric acid.

SPECIFIC EXAMPLES OF INVENTION

EXAMPLE 1

A buffer was prepared by adding 22 grams citric acid and 4 grams sodium hydroxide to 1 liter of water. 0.15 grams sorbic acid and 0.45 grams sodium propionate were added to the solution. A control solution containing 2% salt in water was also prepared. Shelled hard-boiled eggs were packed in these solutions and held for 5 weeks at 40° F.

After 5 weeks at 40° F. the control was slimey. The treated samples were unspoiled. One treated sample was held for 6 months and at the end of this period was found to have no off flavor or odor and no slime, but lacked typical egg flavor.

EXAMPLE 2

A buffer was prepared by adding 9.5 grams citric acid and 4.0 grams sodium hydroxide to 1 liter of water. The pH of this buffer was 5.5. Two solutions were prepared as follows:

Solution A — 0.45 grams sorbic acid and 1.35 grams sodium propionate were added to 300 ml. buffer.

Solution B — 0.8 grams methyl parabenzoic acid was added to 400 ml. buffer.

Shelled hard-boiled eggs were packed in these solutions in separate jars annd held for 5 weeks at 40° F.

No off odor or color developed in either sample in 5 weeks.

EXAMPLE 3

A buffer was prepared by adding 6.4 grams citric acid and 2.1 grams sodium hydroxide to 1 liter of water. The pH of this buffer was 5.0. Two solutions were prepared as follows:

Solution A — 0.45 grams sorbic acid and 1.35 grams sodium propionate were added to 300 ml. buffer.

Solution B — 0.3 grams methyl parabenzoic acid was added to 300 ml. buffer.

Shelled hard-boiled eggs were packed in 4 samples, 2 of each solution, in jars and held at 40° F. One sample of eggs in each solution were held for 5 weeks, the other two were held 10 weeks. At the end of the holding periods, the eggs were examined and egg salad prepared and tasted.

The samples held for 5 weeks at 40° F. were found to be free of slime, off odors and off colors. The appearance of the yolks seemed a somewhat brighter shade of yellow than one would normally expect, but this was not objectionable. Egg salad was prepared by chopping the eggs and adding mayonnaise and seasoning with salt and pepper. The resulting salad was quite acceptable, being free of off flavors and having good typical taste.

EXAMPLE 4

In this test Example 3 was repeated with the exception that the levels of sorbic acid and sodium propionate in Solution A and methyl parabenzoic acid in Solution B were reduced by one-half. As previously, four samples of shelled hard-boiled eggs were packed in jars, two in each solution. One sample of each solution was held 5 weeks at 40° F., the remaining two samples held for 10 weeks at 40° F. At the end of the holding periods the eggs were examined and egg salad prepared and tasted.

The eggs held for 5 weeks at 40° F. were free of slime, off odor and off colors. They had the appearance of freshly prepared hard-boiled eggs. Egg salad was prepared by chopping the eggs and adding mayonnaise and seasoning with salt and pepper. The resulting salad was very acceptable, having very good flavor and appearance.

EXAMPLE 5

A buffer was prepared by adding 7 grams citric acid and 4 grams sodium hydroxide to 1 liter of water. The pH of this buffer was 5.0. The following solutions were then prepared:

Control — 2% salt in water.

Solution A ' 0.15% sorbic acid and 0.45% sodium propionate in buffer.

solution B — 0.2% methyl parabenzoic acid in buffer.

Fresh shrimp were boiled and peeled, packed in the above solutions in jars, and held at 40° F. for 5 weeks.

After 5 weeks, the control had developed gas in the jar, a distinct off odor and a soft, "flabby" texture. The treated samples, on the other hand, developed neither off odor or gas, and exhibited no change in texture.

EXAMPLE 6

In this test Example 5 was repeated with the exception that the levels of sorbic acid and sodium propionate in Solution A and methyl parabenzoic acid in Solution B were reduced by one-half. Shrimp were prepared as previously, packed in jars, held at 40° F., and observed weekly.

After 4 weeks, the control was spoiled as evidenced by the presence of gas in the jar and a distinct off odor. Texture of the control was somewhat soft. The treated samples were observed for a period of 4 months, at the end of which no evidence of spoilage was present.

EXAMPLE 7

A buffer containing 7 grams citric acid and 4 grams sodium hydroxide per liter of water was prepared. The following solutions were then made:

Control — 2% salt in water.

Solution A — 0.15% sorbic acid and 0.45% sodium propionate in buffer.

Solution B — 0.2% methyl parabenzoic acid in buffer.

Bread crumbs were applied to a portion of fresh scallops which were then deep-fat fried and packed in the above solutions in jars. A second portion of scallops, these unbreaded and uncooked, were similarly packed. All of the above samples were held at 40° F.

After 5 weeks at 40° F. all control samples were spoiled as indicated by gas formation in the jars and pronounced off odor. The treated samples were held for 5 months at 40° F. and at the end of this period remained unspoiled.

EXAMPLE 8

A buffer was prepared with 7.0 grams of citric acid and 2.7 grams of sodium hydroxide in 1 liter of water (pH 5.0). To one portion of this buffer methyl parabenzoic acid was added in a concentration of 0.1%. To another portion sorbic acid and sodium propionate were added in concentrations of 0.15% and 0.45% respectively. A control solution containing 1.0% sodium chloride in water was also prepared.

Eight eggs were hard-boiled, peeled and inoculated with a culture of *Salmonella typhimurium.* Two eggs were placed in one jar and convered with 100 ml. of the buffer plus methyl parabenzoic acid solution. Two eggs were placed in a jar and covered with 100 ml. of the buffer plus sorbic acid and sodium propionate solution. Two eggs were placed in a jar and covered with 100 ml. of the control solution. Two eggs were placed in 100 ml. of sterile water, shaken and diluted serially. Bacterial counts were then made on this last sample on bismuth sulfite agar and incubated for 2 days at 98.6° F.

The control and test eggs in their respective solutions were held for 7 days at 40° F. after which the jars were shaken, the liquid diluted serially and counts made on bismuth sulfite agar incubated for 2 days at 98.6° F.

The results of this test are as follows:

| Sample | Salmonella per ml. |
|---|---|
| Count at start | 144,000 |
| Control - salt solution 7 days at 40° F. | 100,000 |
| Buffer plus methyl parabenzoic acid - 7 days at 40° F. | 50,000 |
| Buffer plus sorbic acid and sodium propionate - 7 days at 40° F. | 17,000 |

Conclusions — No increase in salmonellae occurred in the eggs in buffer plus chemical solutions held for 7 days at 40° F., and there was some decrease in the number of these organisms as compared to the eggs held in salt solution for this time and at this temperature.

A second test was conducted as described above with the exception that the eggs were inoculated with *Staphylococcus aureus* at the start and counts were made on Baird-Parker egg yolk agar and incubated for 2 days at 98.6° F.

The results of this test are as follows:

| Sample | Staphylococcus per ml. |
|---|---|
| Count at start | 6,000,000 |
| Control - salt solution 7 days at 40° F. | 3,700,000 |
| Buffer plus methyl parabenzoic acid - 7 days at 40° F. | 1,800,000 |
| Buffer plus sorbic acid and sodium propionate - 7 days at 40° F. | 80,000 |

It may be similarly concluded that no increase in staphylococci occurred in the eggs in buffer plus chemical solutions and there was some decrease in the number of these organisms as compared to the eggs held in salt solution for this time and at this temperature.

EXAMPLE 9

A buffer was prepared with 9.5 grams of citric acid and 4.5 grams of sodium hydroxide in one liter of water. To one portion methyl parabenzoic acid was added to a concentration of 0.1%. To another portion sorbic acid and sodium propionate were added to concentrations of 0.15% and 0.45% respectively.

Eight eggs were hard-boiled, peeled, then inoculated with *Salmonella typhimurium.* Two eggs were placed in a jar and covered with 100 ml. of a 1% salt solution. Two eggs were placed in a jar and covered with 100 ml. of the buffer plus methyl parabenzoic acid solution. Two eggs were placed in a jar and covered with 100 ml. of the buffer plus sorbic acid and sodium propionate solution. All prepared samples were then held for 1 day at 75° F. then for 6 days at 40° F. Bacterial counts were made at the start on the liquid from two inoculated eggs which has been placed in 100 ml. of sterile water and on serial dilutions of this liquid. Bismuth sulfite agar incubated at 98.6° F. for 2 days was used to make the counts.

After storage, eggs in control and buffer plus chemical solutions were shaken and diluted serially. Counts were then made on bismuth sulfite agar incubated for 2 days at 98.6° F.

The results of this test are as follows:

| Sample | Salmonella per ml. |
|---|---|
| Count at start | 72,000 |
| Control - salt solution - 1 day at 75° F. - 6 days at 40° F. | 100,000,000 |
| Buffer plus methyl parabenzoic acid 1 day at 75° F. - 6 days at 40° F. | 85,000 |
| Buffer plus sorbic acid and sodium propionate - 1 day at 75° F. - 6 days at 40° F. | 1,100 |

Conclusions — No significant increase in salmonellae occurred in the eggs held in buffer plus methyl parabenzoic acid solution for 1 day at 75° F. and 6 days at 40° F. A marked increase in the number of salmonellae occurred in the eggs held in salt solution for 1 day at 75° F. and 6 days at 40° F. A marked decrease in the number of salmonellae occurred in the eggs held in the buffer plus sorbic acid and sodium propionate solution for 1 day at 75° F. and 6 days at 40° F.

A second test was conducted as described in Example 9 with the exception that the eggs were inoculated with a culture of *Staphylococcus aureus* and bacterial counts were made on Baird-Parker egg yolk agar incubated 2 days at 98.6° F.

The results of this test are as follows:

| Sample | Staphylococcus per ml. |
|---|---|
| Count at start | 530,000 |
| Control - salt solution 1 day at 75° F. - 6 days at 40° F. | 58,000,000 |
| Buffer plus methyl parabenzoic acid 1 day at 75° F. - 6 days at 40° F. | 34,000 |
| Buffer plus sorbic acid and sodium propionate - 1 day at 75° F. - 6 days at 40° F. | 3,500 |

Conclusions — At 75° F. for 1 day and 40° F. for 6 days there was a marked increase in the number of staphylococci on eggs held in salt solution. A marked decrease occurred in the number of staphylococci on eggs held in the buffer plus chemical solutions.

EXAMPLE 10

Four hard-boiled eggs were contaminated with *Salmonella typhimurium* and one egg was placed in each of four glass jars. To two of the samples 100 ml. of a 2% sodium chloride control solution was added. One of these control samples was shaken and plated out in serial dilutions on bismuth sulfite agar medium. The other control was held at 75° F. for 7 days. To one jar containing a contaminated egg 100 ml. of citric acid and sodium hydroxide buffer (pH 4.5) plus 0.1% methyl parabenzoic acid was added. The jar was capped and held for 7 days at 75° F. To the fourth jar containing a contaminated egg 100 ml. of buffer plus 0.15% sorbic acid and 0.45% sodium propionate was added, the jar capped, and held for 7 days at 75° F.

The results of this test are as follows:

After 7 days at 75° F. the control was cloudy while the samples containing buffer plus chemicals were clear and not cloudy. At this time all samples were plated out in serial dilutions of bismuth sulfite agar.

| Sample | Salmonella per ml. |
|---|---|
| Count at start | 8,600 |
| Control - salt solution 7 days at 75° F. | 8,600,000 |
| Buffer plus methyl parabenzoic acid - 7 days at 75° F. | 140 |
| Buffer plus sorbic acid and sodium propionate - 7 days at 75° F. | Less than 10 |

The test as described in Example 10 was repeated, with the exception that the eggs were inoculated with a culture of *Staphylococcus aureus* and bacterial counts made on Baird-Parker egg yolk agar.

The results of this test are as follows:

After 7 days at 75° F. the control was cloudy while the samples containing buffer plus chemicals were clear and not cloudy. At this time all samples were plated out in serial dilutions on Baird-Parker egg yolk agar medium.

| Sample | Staphylococcus per ml. |
|---|---|
| Count at start | 16,000 |
| Control - salt solution 7 days at 75° F. | 27,000,000 |
| Buffer plus methyl parabenzoic acid - 7 days at 75° F. | 220 |
| Buffer plus sorbic acid and Sodium propionate - 7 days at 75° F. | Less than 10 |

Conclusions — In 2% salt solution the count of salmonellae or staphylococci on contaminated eggs held for 7 days at 75° F. increased markedly. In buffered solutions of methyl parabenzoic acid or sorbic acid plus sodium propionate the count of salmonellae or staphylococci on contaminated eggs held for 7 days at 75° F. decreased markedly.

EXAMPLE 11

Ten eggs were hard-boiled and peeled. All eggs were inoculated with spores of type B *Clostridium botulinum* then placed in glass jars, one egg per jar. In four jars, labelled C0, C1, C2, and C3, the eggs were covered with 100 ml. of 1% sodium chloride solution.

The eggs in three other jars were covered with 100 ml. of a solution containing a buffer (7 grams of citric acid and 2.4 grams of sodium hydroxide per liter, pH 4.5) and 1 gram of methyl parabenzoic acid per liter. These were labelled B1, B2, and B3.

The eggs in three other jars were covered with 100 ml. of a solution containing a buffer (7 grams of citric acid and 24 grams of sodium hydroxide per liter, pH 4.5) and 1.5 grams of sorbic acid plus 4.5 grams of sodium propionate per liter. These were labelled A1, A2, and A3.

The egg in one jar was shaken in its solution and a count for anaerobic bacteria on stratified agar in Miller-Prickett tubes was made immediately. Cultures were incubated for 18 to 48 hours at 30° C.

All samples were stored at 24° C. (75° F.).

When the solution in the control samples had become cloudy, counts were made as indicated above.

For samples labelled B1, B2, or B3, or A1, A2, or A3, counts were made when the samples became cloudy or at weekly intervals if no cloudiness occurred.

The results were as follows:

| Sample | Storage Time | Appearance | Clostridia per ml. in solution containing an inoculated egg |
|---|---|---|---|
| control | 0 days | | 4,600 |
| control | 4 days | cloudy | 800,000 |
| " | " | " | 42,000,000 |
| " | " | " | 580,000 |
| Buffer plus paraben | 7 days | clear | 2,700 |
| " | " | " | 2,300 |
| " | " | " | 2,600 |
| " | 9 days | cloudy | 10,000,000 |
| " | 14 days | clear | 1,300 |
| " | " | " | 2,000 |
| " | 16 days | cloudy | not counted |
| " | 20 days | " | not counted |
| Buffer plus sorbic plus propionate | 7 days | clear | 2,500 |
| " | " | " | 3,000 |
| " | " | " | 3,700 |
| " | 14 days | " | 90 |
| " | " | " | 150 |
| " | " | " | 140 |
| " | 27 days | " | less than 10 |
| " | " | " | " |
| " | " | " | " |

CONCLUSIONS

1. In 4 days at 24° C. there was an extensive growth in boiled peeled eggs inoculated with type B *Clostridium botulinum* and held in saline solution.

2. In 9 days at 24° C. there was extensive growth in buffer solutions containing 0.1% of methyl parabenzoic acid in which an egg inoculated with type B *Clostridium botulinum* was held.

3. During a period of 27 days at 24° C. there was no growth in buffer solutions containing 0.15% sorbic acid and 0.45% sodium propionate in which eggs inoculated with type B *Clostridium botulinum* were held. Actually during this period there was a decrease in the number of cells of *Clostridium botulinum* to the point where no count could be obtained.

EXAMPLE 12

SOLUTION A

A buffer solution having a pH of 4.5 was prepared by dissolving 21.26 grams of $KH_2PO_4$, 8.51 grams of $K_2HPO_4$, and 5 ml. of 85% phosphoric acid ($H_3PO_4$) in 4.55 liters of water. Bacteriostat in the form of 5.39 grams of sorbic acid and 16.16 grams of sodium propionate mixed with 28.35 grams of sodium chloride as an inert carrier were added to the buffer solution.

SOLUTION B

A buffer solution having a pH of 4.5 was prepared by dissolving 21.26 grams of $KH_2PO_4$, 8.51 grams of $K_2HPO_4$ and 5 ml. of 85% phosphoric acid ($H_3PO_4$) in 4.55 liters of water. Bacteriostat in the form of 4.5 grams of methyl parabenzoate was added to the buffer soltuion.

SOLUTION C

A third solution was prepared as a 1% salt (sodium chloride) solution in distilled water.

Eggs were hard boiled, deshelled and placed in each of three jars. The eggs in one jar were covered with Solution A, those in another jar with Solution B and those in a third jar with Solution C. The jars were capped and these products were held at 75° F. for 32 days. After this time the solution (with eggs) in each jar was shaken and plate counts were made on serial dilutions of the solution on plate count agar. Plates were inoculated at 75° F. for 5 days prior to counting.

The results were as follows:

| Sample | | Counts (Per ML) | Average Count |
|---|---|---|---|
| Solution A | (phosphate buffer plus sorbic acid plus sodium propionate) | 1,800 | 2,000 Per ML |
| Solution B | (phosphate buffer plus methyl parabenzoate) | less than 500,000<br>less than 500,000 | less than 500,000 per ML |
| Solution C | (salt solution control) | 66,000,000<br>95,000,000 | 81,000,000 per ML |

We claim:

1. A process for inhibiting the bacterial growth of certain food products while maintaining flavor and texture, said food products consisting of shelled hard-cooked eggs, cooked de-shelled shellfish and cooked mushrooms; said process comprising storing such food products under refrigeration in an aqueous solution comprising:

A. a bacterial inhibitor selected from the class consisting of
   (1) approximately 0.08 to 0.20% methyl parabenzoic acid, and
   (2) a mixture of approximately 0.075 to 0.15% sorbic acid with approximately 0.22 to 0.45% sodium propionate, and B. a buffering agent in amounts sufficient to maintain the pH of the solution in the range of approximately 4.5 to 5.5 and selected from the group consisting of
   (1) a mixture of citric acid and sodium or potassium hydroxide, and
   (2) a mixture of
      a) sodium or potassium monohydrogen phosphate,
      b) sodium or potassium dihydrogen phosphate, and
      c) phosphoric acid.

2. The process of claim 1 wherein the bacterial inhibitor is approximately 0.08 to 0.20% methyl parabenzoic acid.

3. The process of claim 1 wherein the bacterial inhibitor is a mixture of approximately 0.075 to 0.15% sorbic acid with approximately 0.22 to 0.45% sodium proprionate.

4. The process of claim 1 wherein the buffering agent is a mixture of citric acid and sodium or potassium hydroxide.

5. The process of claim 1 wherein the buffering agent is a mixture of
   a) sodium or potassium monohydrogen phosphate,
   b) sodium or potassium dihydrogen phosphate, and
   c) phosphoric acid.

6. The process of claim 1 wherein the bacterial inhibitor is a mixture of approximately 0.075 to 0.15% sorbic acid with approximately 0.22 to 0.45% sodium propionate and the buffering agent is a mixture of citric acid and sodium or potassium hydroxide.

7. The process of claim 1 wherein the bacterial inhibitor is a mixture of approximately 0.75 to 0.15% sorbic acid with approximately 0.22 to 0.45% sodium propionate and the buffering agent is a mixture of
   a) sodium or potassium monohydrogen phosphate,
   b) sodium or potassium dihydrogen phosphate, and
   c) phosphoric acid.

8. The process of claim 1 wherein the buffering agent is a mixture of citric acid and sodium or potassium hydroxide and the bacterial inhibitor is approximately 0.08 to 0.20% methyl parabenzoic acid.

9. The process of claim 1 wherein the bacterial inhibitor is approximately 0.08 to 0.20% methyl parabenzoic acid and the buffering agent is a mixture of
   a) sodium or potassium monohydrogen phosphate,
   b) sodium or potassium dihydrogen phosphate, and
   c) phosphoric acid.

10. An aqueous solution which upon contacting certain food products inhibits bacterial growth while maintaining flavor and texture, said food products consisting of shelled, hard-cooked eggs, cooked de-shelled shellfish and cooked mushrooms; said solution comprising:

A. a bacterial inhibitor selected from the class consisting of approximately 0.08 to 0.20% methyl parabenzoic acid and a mixture of approximately 0.075 to 0.15% sorbic acid with approximately 0.22 to 0.45% sodium propionate, and B. a buffering agent in amounts sufficient to maintain the pH of the solution in the range of approximately 4.5 to 5.5 and selected from the group consisting of:
   (1) a mixture of citric acid and sodium or potassium hydroxide, and
   (2) a mixture of
      a) sodium or potassium monohydrogen phosphate,
      b) sodium or potassium dihydrogen phosphate, and
      c) phosphoric acid.

11. The solution of claim 10 wherein the bacterial inhibitor is approximately 0.08 to 0.20% methyl parabenzoic acid.

12. The solution of claim 10 wherein the bacterial inhibitor is a mixture of approximately 0.075 to 0.15% sorbic acid with approximately 0.22 to 0.45% sodium propionate.

13. The solution of claim 10 wherein the buffering agent is a mixture of
   a) sodium or potassium monohydrogen phosphate,
   b) sodium or potassium dihydrogen phosphate, and
   c) phosphoric acid.

14. The solution of claim 10 wherein the buffering agent is a mixture of citric acid and sodium or potassium hydroxide.

15. The solution of claim 10 wherein the bacterial inhibitor is a mixture of approximately 0.075 to 0.15% sorbic acid with approximately 0.22 to 0.45% sodium propionate and the buffering agent is a mixture of citric acid and sodium or potassium hydroxide.

16. The solution of claim 10 wherein the bacterial inhibitor is a mixture of approximately 0.075 to 0.15% sorbic acid with approximately 0.22 to 0.45% sodium propionate and the buffering agent is a mixture of
   a) sodium or potassium monohydrogen phosphate,
   b) sodium or potassium dihydrogen phosphate, and
   c) phosphoric acid.

17. The solution of claim 10 wherein the buffering agent is a mixture of citric acid and sodium or potassium hydroxide and the bacterial inhibitor is approximately 0.08 to 0.20% methyl parabenzoic acid.

18. The solution of claim 10 wherein the bacterial inhibitor is approximately 0.08 to 0.20% methyl parabenzoic acid and the buffering agent is a mixture of a) sodium or potassium monohydrogen phosphate, b) sodium or potassium dihydrogen phosphate, and c) phosphoric acid.

* * * * *